(No Model.)

G. H. LOMAX.
GLASS BLOWER'S MOLD.

No. 351,784. Patented Nov. 2, 1886.

Witnesses.
S. N. Piper.
18. 13. Torrey.

Inventor.
George H. Lomax.
by R. H. Eddy atty.

N. PETERS, Photo-Lithographer, Washington, D. C.

UNITED STATES PATENT OFFICE.

GEORGE HENRY LOMAX, OF SOMERVILLE, MASSACHUSETTS.

GLASS-BLOWER'S MOLD.

SPECIFICATION forming part of Letters Patent No. 351,784, dated November 2, 1886.

Application filed July 19, 1886. Serial No. 208,357. (No model.)

*To all whom it may concern:*

Be it known that I, GEORGE HENRY LOMAX, of Somerville, in the county of Middlesex, of the Commonwealth of Massachusetts, have invented a new and useful Improvement in Glass-Blowers' Molds; and I do hereby declare the same to be described in the following specification and represented in the accompanying drawings, of which—

Figure 1:
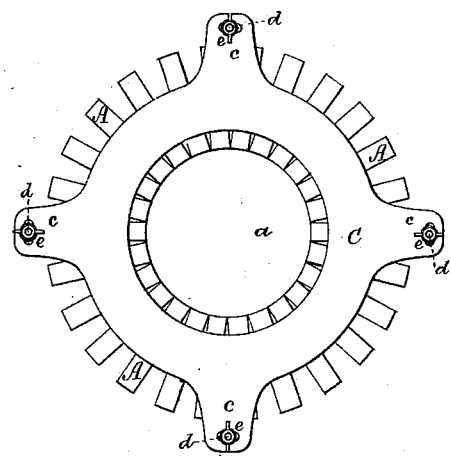
Figure 3:
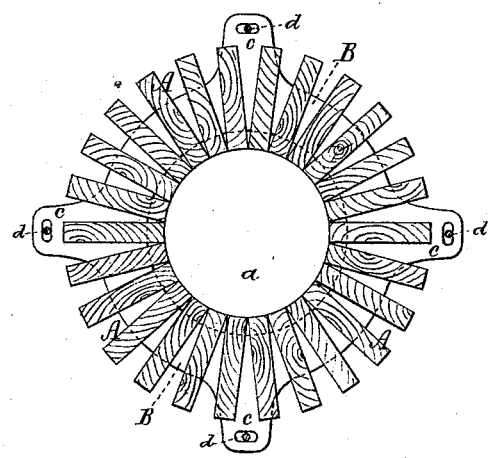
Figure 2:
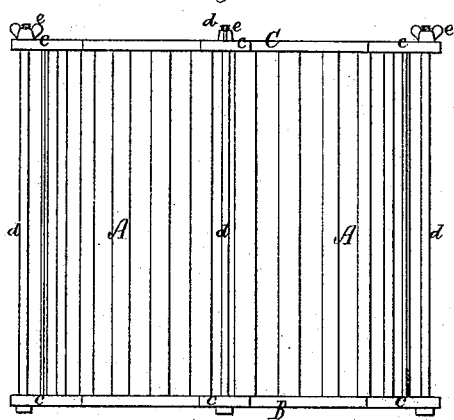
Figure 4:
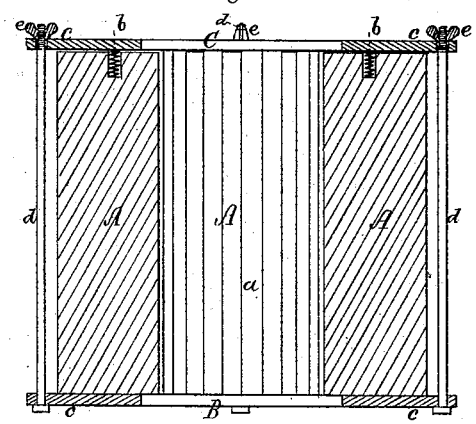

Figure 1 is a top view, Fig. 2 a front elevation, Fig. 3 a horizontal section, and Fig. 4 a vertical and median section, of a mold of my invention, the nature of which is defined in the claims hereinafter presented.

The said mold is for use by a glass-blower in the process of blowing a hollow vessel or bottle of glass, especially one of cylindrical or prismatic form.

In the said drawings, A A, &c., is a set or series of rectangular or other proper shaped pieces of board or plank, arranged in a circle in radial directions about its center and meeting together at the sides of their inner edges, as shown. They rest endwise upon a flat circular ring, B, of metal, the internal periphery of which has a diameter longer than that of the cylindrical or prismatic space $a$, encompassed by the boards. Each board has extending from it at its upper end, and inserted in it, one or more spiral springs, $b$, upon which and the upper ends of the boards there is placed a flat ring, C, in all respects essentially like the ring B. Each ring is provided with a set of ears or extensions, $c$, projecting from it, as shown. Screw-bolts $d$, having nuts $e$ screwed on them at their upper ends, go through the ears of both rings. On setting up the nuts the several boards will be clamped in position between and by the two rings.

In using the mold the workman introduces within the matrix $a$ the mass of molten glass to be blown into a cylindrical shape, such mass at the time being attached to the tube used in blowing it. While expanding the mass he is to turn or move it within the matrix until the article blown may be of the desirable form or character—that is, a mainly cylindrical or prismatic bottle or vessel. As the pieces of wood may vary a little in their lengths, the springs inserted in them will insure their being held in position by the rings when the nuts of their screw-bolts are set up. As the boards on their inner edge may become burned away by use in contact with the hot glass, they may be moved inwardly so as to touch each other at such edges, in manner as represented in Fig. 3. A mold so made is very durable, and is much preferable to one formed with staves arranged and hooped like those of a barrel. Preparatory to using the mold the inner edges of the boards are to be wet with water.

With my improved mold cylinders of different diameters may be formed, as by removing some of the boards from or adding others to the series, as occasion may require, the requisite number for forming the cylindrical opening of the required diameter in the mold may be obtained with great expedition.

I claim—

1. The improved glass-blower's mold, substantially and for use as described, consisting of the two clamping-rings and their screw-bolts and nuts, and the series of boards meeting together at the sides of their inner edges and arranged in radial directions between the said rings, as set forth.

2. The improved glass-blower's mold, substantially and for use as described, consisting of the two clamping-rings, their screw-bolts and nuts, and the series of boards meeting together at the sides of their inner edges, and arranged in radial directions about and from a common axis or center, and having springs at their ends, to operate essentially as set forth.

GEORGE HENRY LOMAX.

Witnesses:
R. H. EDDY,
R. B. TORREY.